US008310850B2

(12) United States Patent
Polivka

(10) Patent No.: US 8,310,850 B2
(45) Date of Patent: Nov. 13, 2012

(54) METHOD AND APPARATUS FOR VARYING CURRENT LIMIT TO LIMIT AN OUTPUT POWER OF A POWER SUPPLY

(75) Inventor: William M. Polivka, Campbell, CA (US)

(73) Assignee: Power Integrations, Inc., San Jose, CA (US)

( * ) Notice: Subject to any disclaimer, the term of this patent is extended or adjusted under 35 U.S.C. 154(b) by 273 days.

(21) Appl. No.: 12/645,295

(22) Filed: Dec. 22, 2009

(65) Prior Publication Data
US 2011/0149619 A1    Jun. 23, 2011

(51) Int. Cl.
| | |
|---|---|
| H02H 7/122 | (2006.01) |
| H02H 7/00 | (2006.01) |
| H02H 9/08 | (2006.01) |
| H02M 3/335 | (2006.01) |
| G05F 1/00 | (2006.01) |

(52) U.S. Cl. .............. 363/56.03; 363/21.13; 361/18; 361/93.9; 323/284

(58) Field of Classification Search ............... 363/56.01, 363/56.03, 56.04, 21.05, 21.09, 21.12, 21.13, 363/21.17; 361/18, 93.9; 323/284
See application file for complete search history.

(56) References Cited

U.S. PATENT DOCUMENTS

| | | | | |
|---|---|---|---|---|
| 7,486,062 | B2 * | 2/2009 | Balakrishnan et al. | 323/284 |
| 7,502,235 | B2 * | 3/2009 | Huang et al. | 363/21.01 |
| 7,616,454 | B2 * | 11/2009 | Yang | 363/15 |
| 8,077,483 | B2 * | 12/2011 | Djenguerian et al. | 363/21.01 |
| 2008/0247202 | A1 | 10/2008 | Djenguerian et al. | |
| 2009/0303756 | A1 * | 12/2009 | Huang et al. | 363/21.12 |

OTHER PUBLICATIONS

Fairchild Semiconductor, Application Note AN-4150, Design Guildelines for Flyback Converters Using FSQ-Series Fairchild Power Switch (FPSTM), www.fairchildsemi.com, 2006.*
Wong, K., "Stable DCM Design of a Novel Variable Frequency Peak-Current State-Machine Controller," IEEE, 2009, p. 426-432.
Wong, K. et al., "Energy-Efficient Peak-Current Controlled Power Conversion IC Family Delivers 3 to 28 Watts in Universal-Input Flyback Power Supplies," IEEE, 2007, p. 325-331.
Wong, K., "Energy-Efficient Peak-Current State-Machine Control with a Peak Power Mode," IEEE Transactions on Power Electronics, vol. 24, No. 2, Feb. 2009, p. 489-498.
KR 10-2010-131425—KIPO's Notice of Preliminary Rejection with English Translation, issued Apr. 26, 2012 (6 pages).
"Application Note AN-4150: Design Guidelines for Flyback Converters Using FSQ-series Fairchild Power Switch (FPS™)," Fairchild Semiconductor Corporation, Rev. 1.0.0, Oct. 23, 2006 (16 pages).

* cited by examiner

Primary Examiner — Gary L Laxton
Assistant Examiner — Zekre Tsehaye
(74) Attorney, Agent, or Firm — Blakely Sokoloff Taylor & Zafman LLP

(57) ABSTRACT

A power supply controller is disclosed. An example power supply controller includes an input voltage sense input coupled to sense an input voltage sense signal representative of an input voltage of a power supply. An output voltage sense input is coupled to sense an output voltage sense signal representative of an output voltage of the power supply. A current limit circuit is coupled to generate a current limit signal. The current limit signal is varied relative to a first ratio representative of a ratio of a product of the input voltage and a scaled output voltage of the power supply, to a sum of the input voltage and the scaled output voltage of the power supply. A drive signal generator is coupled to generate a drive signal in response to the current limit signal to drive the power switch of the power supply to limit an output power of the power supply in response to the input voltage.

23 Claims, 8 Drawing Sheets

METHOD AND APPARATUS FOR VARYING CURRENT LIMIT TO LIMIT AN OUTPUT POWER OF A POWER SUPPLY

BACKGROUND INFORMATION

1. Field of the Disclosure

The present invention relates generally to power supplies and, more specifically, the present invention relates to a switched mode power supply.

2. Background

All electronic devices use power to operate. A form of power supply that is highly efficient and at the same time provides acceptable output regulation to supply power to electronic devices or other loads is the switched-mode power supply. In many electronic device applications, such as for example the low power off-line adapter/charger market, during the normal operating load range of the power supply an approximately constant output peak power is desired over a range of input voltage values.

For instance, a typical flyback power supply may be designed to operate from worldwide mains voltages such as for example 85V ac to 265 V ac. In many instances, it is a goal to design a power supply to deliver a maximum specified output power at all input voltages between a minimum specified input voltage and a maximum specified input voltage. For a given output power, the highest current in a power switch in a switched mode power supply occurs at the minimum input voltage. Therefore, the current limit for the switch and the values of other components in the power supply are selected to deliver the specified output power at the minimum input voltage. The power supply typically operates in continuous conduction mode at low input voltages to obtain the most power for a given current limit and component values.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses for implementing a power supply controller having a current limit that is varied to limit an output peak power of the power supply are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As will be discussed, a power supply controller in accordance with the teachings of the present invention includes a current limit circuit that generates a current limit signal that is varied in response to the input and output voltages of the power supply during continuous conduction mode. The current limit signal is used to limit a switch current through a power switch of the power supply to limit an output peak power of the power supply in response to the input voltage. In one example, the current limit signal is varied during continuous conduction mode relative to a first ratio and a second ratio, which is equal to a reciprocal of the first ratio. The first ratio is a product of the input voltage and the reflected output voltage of the power supply, to a sum of the input voltage and the reflected output voltage of the power supply.

Figure 1:
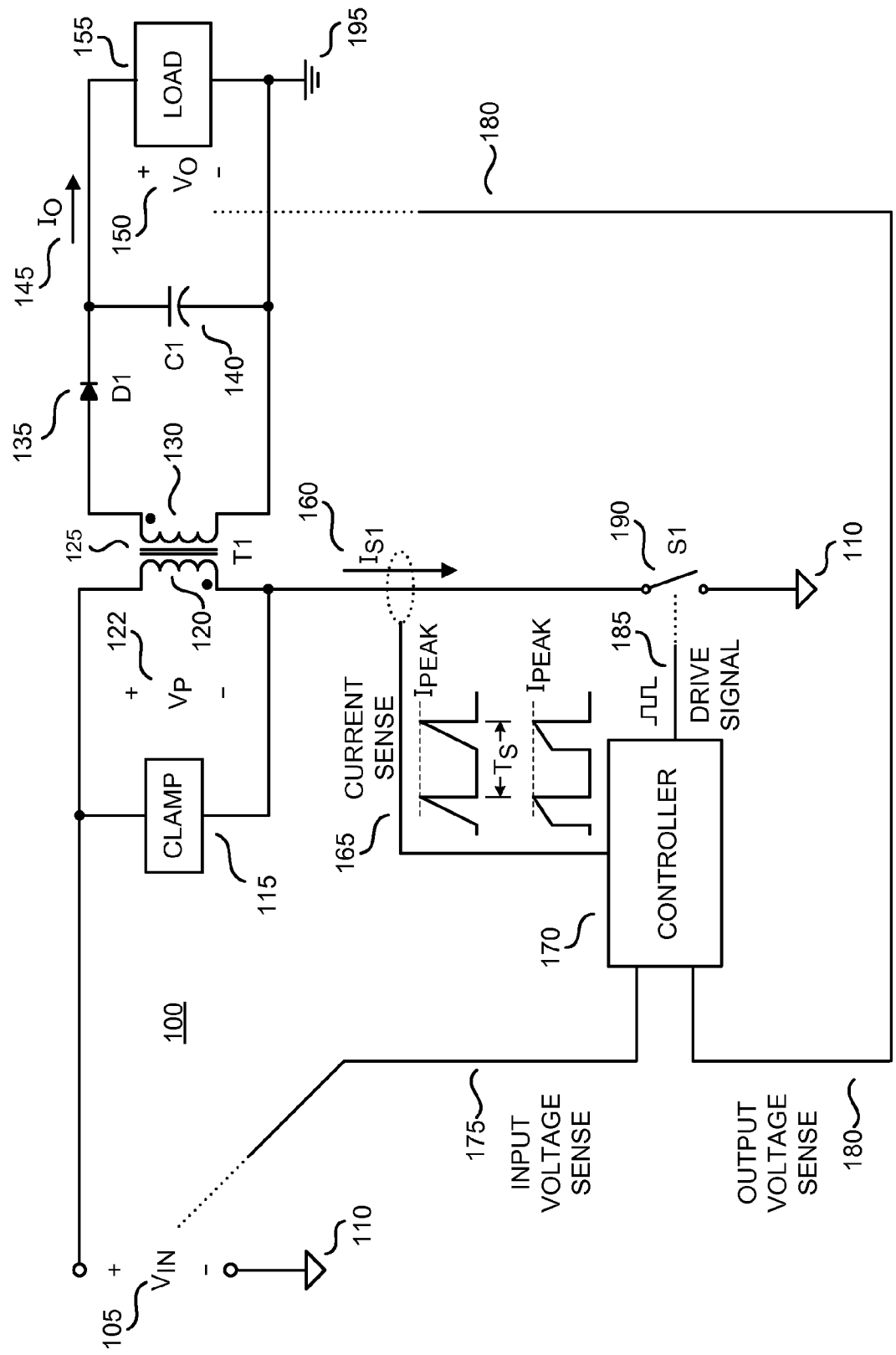
FIG. 1 is a diagram illustrating one example of a power supply including a power supply controller coupled to regulate an output of the power supply with a current limit that is varied in response to input voltage during continuous conduction mode to limit an output peak power of the power supply in accordance with the teachings of the present invention.

To illustrate, FIG. 1 is a diagram illustrating one example of a power supply 100 including a power supply controller 170 coupled to regulate an output of the power supply with a current limit that is varied during continuous conduction mode to limit the output peak power delivered to the output of the power supply 100 in accordance with the teachings of the present invention. In one example, the output peak power of the power supply is limited to an approximately constant value over a range of input voltages. As shown in the depicted example, power supply 100 is coupled to receive an input voltage $V_{IN}$ 105 at the input of the power supply. In one example, $V_{IN}$ 105 is a dc input voltage that has been rectified from an ac line input voltage. In the example shown in FIG. 1, power supply 100 includes an energy transfer element T1 125 having a primary winding 120 coupled to the input of the power supply 100, and an output winding 130 coupled to an output of the power supply 100. In the example, a clamp circuit 115 is coupled across the primary winding 120 to clamp the voltage $V_P$ 122 across primary winding 120. As shown in the example, a diode D1 135 is coupled to the output winding 130 to rectify the output, and a capacitor C1 140 is coupled across the output of the power supply 100. As shown in the example, a load 155 is coupled to the output of the power supply 100 and output current $I_O$ 145 and output voltage $V_O$ 150 are delivered to the load 155 by the power supply 100.

It is noted that in the example depicted in FIG. 1, the input of power supply 100 is galvanically isolated from the output of power supply 100 with energy transfer element 125. Accordingly, it is noted that the ground connection 110 on the primary side of energy transfer element 125 is galvanically isolated from the ground connection 195 on the output side of energy transfer element 125.

In the depicted example, a switch S1 190 is coupled to the primary winding 120. In one example, the power supply controller 170 includes an input voltage sense input coupled to sense an input voltage sense signal 175, which is representative of the input voltage $V_{IN}$ 105. The power supply controller 170 also includes an output voltage sense input coupled to sense an output voltage sense signal 180, which is representative of the output voltage $V_O$ 150. The power supply controller 170 further includes a switch current sense input coupled to sense a switch current sense signal 165, which is representative of the switch current $I_{S1}$ 160 through switch S1 190. In the illustrated example, a drive signal 185 is generated by a drive signal generator included in a power supply controller 170 to control the switching of switch S1 190 in response to the input voltage $V_{IN}$ 105, output voltage $V_O$ 150 and switch current $I_{S1}$ 160 to regulate the output of the power supply 100 in accordance with the teachings of the present invention. In one example, the current limit of switch current $I_{S1}$ is varied in response to the input voltage $V_{IN}$ 105 and output voltage $V_O$ 150 to limit the output peak power delivered to load 155 in accordance with the teachings of the present invention.

In the example illustrated in FIG. 1, a flyback converter topology is shown for power supply 100, as indicated with the dot polarities shown on energy transfer element 125. In general, a flyback converter operating in continuous conduction mode with a switch S1 190 that has a given maximum value for switch current $I_{S1}$ 160 can deliver more power at higher input voltages $V_{IN}$ 105. In other words, a fixed current limit of the switch S1 190 would allow the power supply 100 to deliver more power to the output at a higher input voltage $V_{IN}$ 105 than it can deliver at a lower input voltage $V_{IN}$ 105. Therefore, a power supply 100 operating in continuous conduction mode that protects against overload by limiting the current $I_{S1}$ 160 in the switch S1 190 to a fixed maximum will provide higher overload power at a higher input voltage $V_{IN}$ 105 than it would at a lower input voltage $V_{IN}$ 105.

Figure 2A:
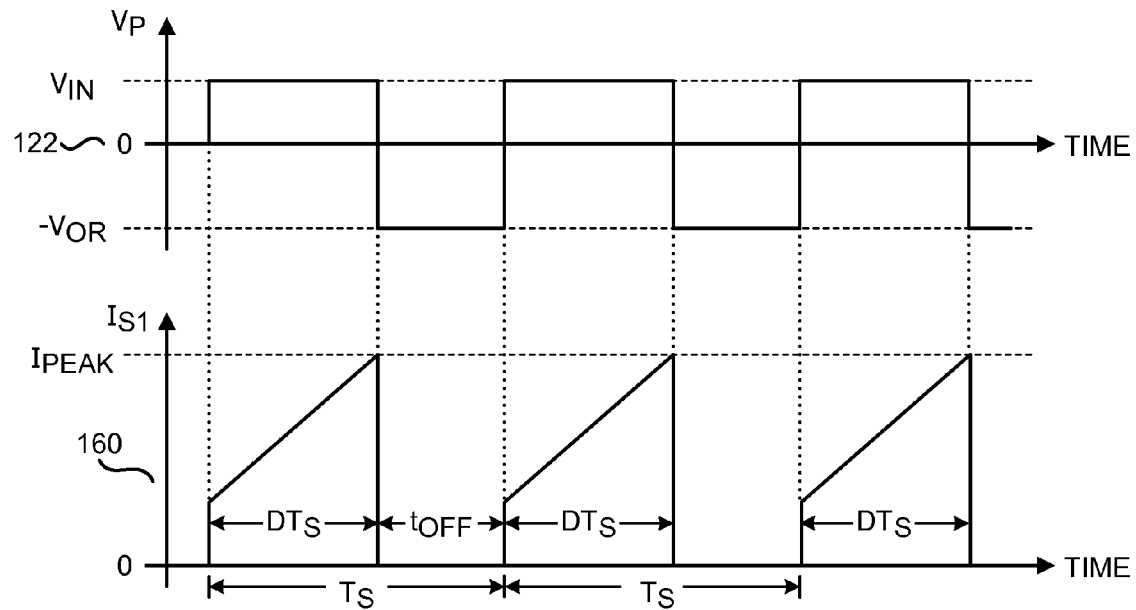
FIG. 2A are timing diagrams illustrating waveforms of one example of a power supply controller operating in continuous conduction mode when regulating the output of the power supply in accordance with the teachings of the present invention.
Figure 2B:
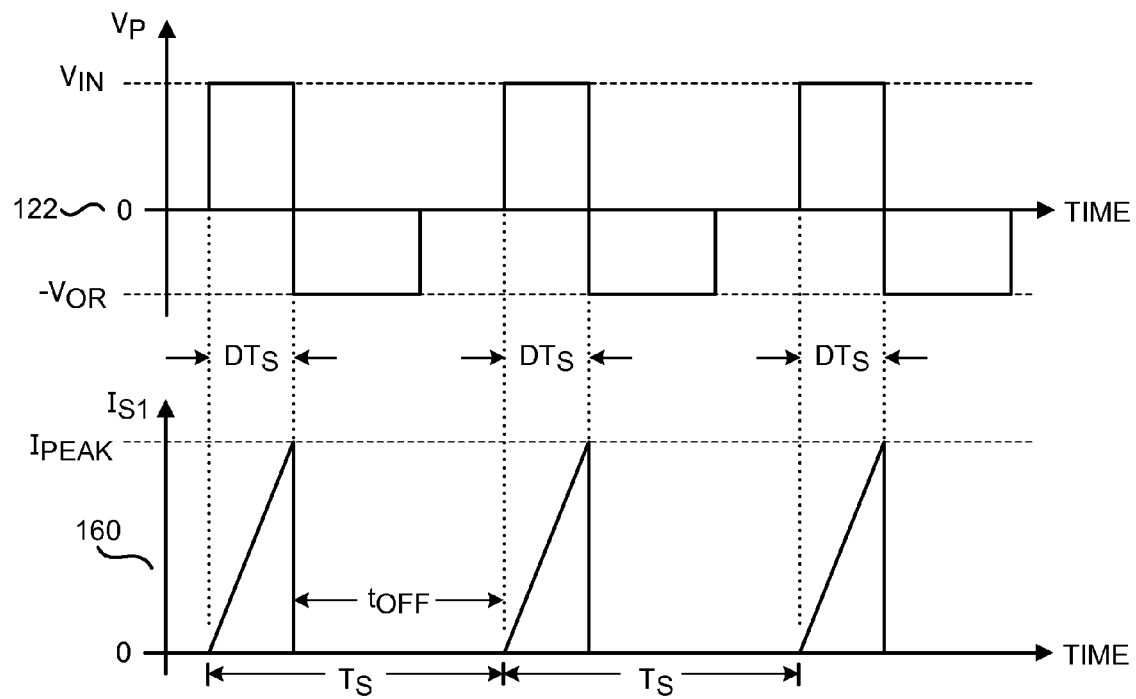
FIG. 2B are timing diagrams illustrating waveforms of one example of a power supply controller operating in discontinuous conduction mode when regulating the output of the power supply in accordance with the teachings of the present invention.

To illustrate continuous conduction mode and discontinuous conduction mode, FIG. 2A shows timing diagrams illustrating waveforms of one example of a power supply controller operating in continuous conduction mode when regulating the output of the power supply in accordance with the teachings of the present invention. FIG. 2B shows timing diagrams illustrating waveforms of one example of a power supply controller operating in discontinuous conduction mode when regulating the output of the power supply in accordance with the teachings of the present invention.

As shown in FIGS. 2A and 2B, the voltage $V_P$ 122 across the primary winding 120 is shown with respect to time as switch S1 190 is switched on and off in response to drive signal 185. FIGS. 2A and 2B also show the switch current $I_{S1}$ 160 through switch S1 190 with respect to time as switch S1 190 is switched on and off in response to drive signal 185. In the example, the frequency $f_S$ of the drive signal 185 is fixed and has a period of $T_S$. In the example, switch S1 190 is shown to be on during the on time labeled $D_{TS}$ and switch S1 is shown to be off during the off time labeled $t_{OFF}$.

Referring specifically to FIG. 2A, which illustrates continuous conduction mode, it is shown that the switch current $I_{S1}$ 160 through switch S1 190 begins each cycle from a non-zero value during the on time of the drive signal 185. The switch current $I_{S1}$ 160 rises during the on time of the drive signal 185 until the switch current $I_{S1}$ 160 reaches the current limit, which is labeled in FIGS. 2A and 2B as $I_{PEAK}$. As shown in FIG. 2A, in continuous conduction mode, the voltage $V_P$ 122 across the 120 primary winding is representative of the input voltage $V_{IN}$ while switch S1 190 is on. In the example, the voltage $V_P$ 122 across the 120 primary winding is representative of the reflected output voltage $V_{OR}$, which is the output voltage $V_O$ reflected through the energy transfer element 125 and is scaled according to a turns ratio of the energy transfer element 125 while switch S1 190 is off.

In discontinuous conduction mode, which is illustrated in FIG. 2B, it is shown that the switch current $I_{S1}$ 160 through switch S1 190 begins each cycle from zero during the on time of the drive signal 185. The switch current $I_{S1}$ 160 rises during the on time of the drive signal 185 until the switch current $I_{S1}$ 160 reaches the current limit, which is labeled in FIGS. 2A and 2B as $I_{PEAK}$. As shown in FIG. 2B, the voltage $V_P$ 122 across the 120 primary winding is representative of the input voltage $V_{IN}$ while switch S1 190 is on. In discontinuous conduction mode, the voltage $V_P$ 122 across the 120 primary winding is representative of the reflected output voltage $V_{OR}$, which is the output voltage $V_O$ reflected through the energy transfer element 125 and is scaled according to the turns ratio of energy transfer element 125 during an initial portion of the off time of switch S1 190 is first turned off. It is appreciated that a current flows through secondary winding 130 and diode 135 during this initial portion of when switch S1 190 is first turned off. It is during this time that the voltage $V_P$ 122 across the 120 primary winding is representative of the reflected output voltage $V_{OR}$. However, after the energy stored in energy transfer element 125 is fully discharged through secondary winding 130 and diode 135, the current through secondary winding 130 and diode 135 no longer flows, the voltage $V_P$ 122 across the 120 primary winding returns to zero for the remaining duration of the off time of switch S1 190 until the next switching cycle begins and switch S1 190 is turned back on in response to drive signal 185.

Figure 3:
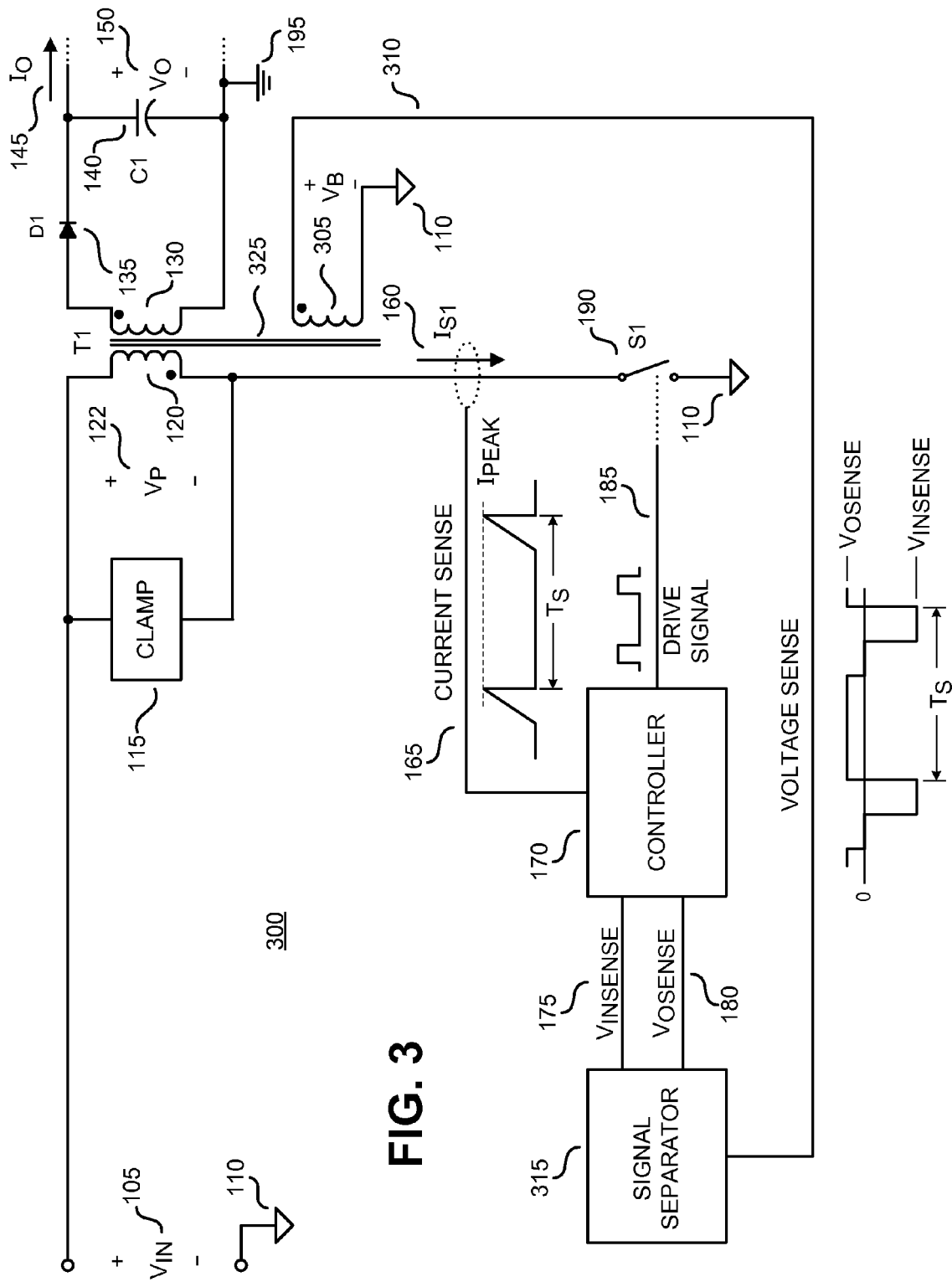
FIG. 3 is a diagram illustrating another example of a power supply including a power supply controller coupled to regulate an output of the power supply with a current limit that is varied in response to input voltage during continuous conduction mode to limit an output peak power of the power supply in accordance with the teachings of the present invention.

FIG. 3 is a diagram illustrating an example of another power supply 300, which includes power supply controller 170 coupled to regulate an output of the power supply 300 with a current limit that is varied during continuous conduction mode to limit an output peak power of the power supply 300 in accordance with the teachings of the present invention. It is appreciated that power supply 300 of FIG. 3 shares many similarities with power supply 100 of FIG. 1. For instance, in the example illustrated in FIG. 3, a flyback converter topology is also shown for power supply 300, as indicated with the dot polarities shown on energy transfer element 325. In the depicted example, power supply 300 is coupled to receive an input voltage $V_{IN}$ 105 at the input of the power supply. In one example, $V_{IN}$ 105 is a dc input voltage that has been rectified from an ac line input voltage. In the example shown in FIG. 3, power supply 300 includes an energy transfer element T1 325 having a primary winding 120 coupled to the input of the power supply 300, an output winding 130 coupled to an output of the power supply 300 and a bias winding 305 magnetically coupled to the primary winding 120 and output winding 130. In the example, a clamp circuit 115 is coupled across the primary winding 120 to clamp the voltage $V_P$ 122 across primary winding 120. As shown in the example, a diode D1 135 is coupled to the output winding 130 to rectify the output, and a capacitor C1 140 is coupled across the output of the power supply 300. In the example, an output current $I_O$ 145 and an output voltage $V_O$ 150 are to be delivered to a load that is to be coupled to the output of power supply 300.

As with the example power supply 100 illustrated in FIG. 1, it is noted that the input of power supply 300 is galvanically isolated from the output of power supply 300 with energy transfer element 325. Accordingly, it is noted that the ground connection 110 is galvanically isolated from the ground connection 195 on the output side of energy transfer element 325.

In the example depicted in FIG. 3, a switch S1 190 is coupled to the primary winding 120. In the example, the power supply controller 170 includes an input voltage sense input coupled to sense an input voltage sense signal 175, which is representative of the input voltage $V_{IN}$ 105. The power supply controller 170 also includes an output voltage sense input coupled to sense an input voltage sense signal 180, which is representative of the output voltage $V_O$ 150. The power supply controller 170 further includes a switch current sense input coupled to sense a switch current sense signal 165, which is representative of the switch current $I_{S1}$ 160 through switch S1 190. In the illustrated example, a drive signal 185 is generated by a drive signal generator included in a power supply controller 170 to control the switching of switch S1 190 in response to the input voltage $V_{IN}$ 105, output voltage $V_O$ 150 and switch current $I_{S1}$ 160 to regulate the output of the power supply 100 in accordance with the teachings of the present invention. In one example, the current limit of switch current $I_{S1}$ is varied in response to the input voltage $V_{IN}$ 105 and output voltage $V_O$ 150 to limit the output peak power delivered to load 155 in accordance with the teachings of the present invention.

In the example power supply 300 shown in FIG. 3, a signal separator 315 is coupled to receive a voltage sense signal 310 from bias winding 305 to sense the voltage $V_B$ across the bias winding 305. In operation, signal separator 315 is coupled to generate input voltage sense signal $V_{INSENSE}$ 175, which is representative of the input voltage $V_{IN}$ 105 during an on time of switch S1 190. Signal separator 315 is also coupled to generate output voltage sense input coupled to sense an input voltage sense signal 180, which is representative of the output voltage $V_O$ 150 during an off time of switch S1 190 in continuous conduction mode, or during at least an initial portion of an off time of switch S1 190 in discontinuous conduction mode.

With respect to power supplies in general, such as for example the flyback converters described previously, it is typically desired to prevent a power supply from delivering more than a specified maximum overload power while guaranteeing that the power supply can deliver the maximum specified output power that is substantially constant over a specified range of input voltages. As will be discussed, the overload power can be limited to a desired maximum in accordance with the teachings of the present invention by varying the current limit of the switch in response to the input voltage during continuous conduction mode.

For a flyback converter operating at constant frequency $f_S$ with a current-limited switch, as would be the case at overload, the output power P at 100% efficiency is in discontinuous conduction mode $$P = \frac{1}{2} L_P I_{PEAK}^2 f_S \qquad (1)$$

and in continuous conduction mode $$P = \left(\frac{V_{IN} V_{OR}}{V_{IN} + V_{OR}}\right)\left(I_{PEAK} - \frac{\left(\frac{V_{IN} V_{OR}}{V_{IN} + V_{OR}}\right)}{2 L_P f_S}\right) \qquad (2)$$

where P is the output power, $L_P$ is the inductance of primary winding 120, $I_{PEAK}$ is the peak current $I_{S1}$ 160 in the switch S1 190, $f_S$ is the switching frequency of switch S1 190, $V_{IN}$ is dc input voltage $V_{IN}$ 105, and $V_{OR}$ is the reflected output voltage. The reflected output voltage $V_{OR}$ is the output voltage $V_O$ 150 as reflected to the primary winding 120 and scaled by the turns ratio of energy transfer element 125.

In Equation (2) above, it is observed that the ratio of the product of the input voltage $V_{IN}$ and the reflected output voltage $V_{OR}$, to the sum of the input voltage $V_{IN}$ and the reflected output voltage $V_{OR}$, can be replaced with the expression $$V_X = \frac{V_{IN} V_{OR}}{V_{IN} + V_{OR}} \qquad (3)$$

that for all values of $V_{IN}$ is bounded between the values of zero and $V_{OR}$. That is, $$0 \leq V_X \leq V_{OR}$$

which results in the simplification of Equation (2) as $$P = V_X \left(I_{PEAK} - \frac{V_X}{2 L_P f_S}\right) \text{ for } 0 \leq V_X \leq V_{OR}. \qquad (4)$$

It can be shown that as $V_X$ increases from zero, the power P increases until $$V_X = V_{XCRIT} = L_P f_S I_{PEAK}, \qquad (5)$$

which is when the operation of power supply 300 enters discontinuous conduction mode and the power P becomes independent of input voltage $V_{IN}$.

Solving for $I_{PEAK}$ in Equation (4) above and assuming that the peak current $I_{PEAK}$ can be considered as the current limit, it can also be shown that the output power P will be independent of the input voltage $V_{IN}$ in continuous conduction mode when the current limit $I_{PEAK}$ is reduced from its value at the minimum input voltage in response to $V_{IN}$ according to the relationship $$I_{PEAK} = \frac{P_{MAXDCM}}{V_X} + \frac{V_X}{2L_P f_S} \qquad (6)$$

where $P_{MAXDCM}$ is the maximum desired overload output power, which occurs at the critical voltage value $$V_X = V_{XCRIT} \qquad (7)$$

and at the critical current value $$I_{PEAK} = I_{PEAKCRIT} \qquad (8)$$

Since the output power P will be independent of input voltage $V_{IN}$, the maximum desired overload output power $P_{MAXDCM}$ is also the maximum power at the minimum input voltage. Thus, the reduction in current limit is stopped when the power supply enters discontinuous conduction mode and the current limit $I_{PEAK}$ is held at the constant value $I_{PEAK} = I_{PEAKCRIT}$ for ratio $V_X > V_{XCRIT}$. It is appreciated that the constant $I_{PEAKCRIT}$ current limit value for $I_{PEAK}$ may also be referred to as $I_{LIMITDCM}$ in this disclosure since it is the constant current limit value for current $I_{S1}$ 160 when the power supply enters discontinuous conduction mode.

Figure 4:
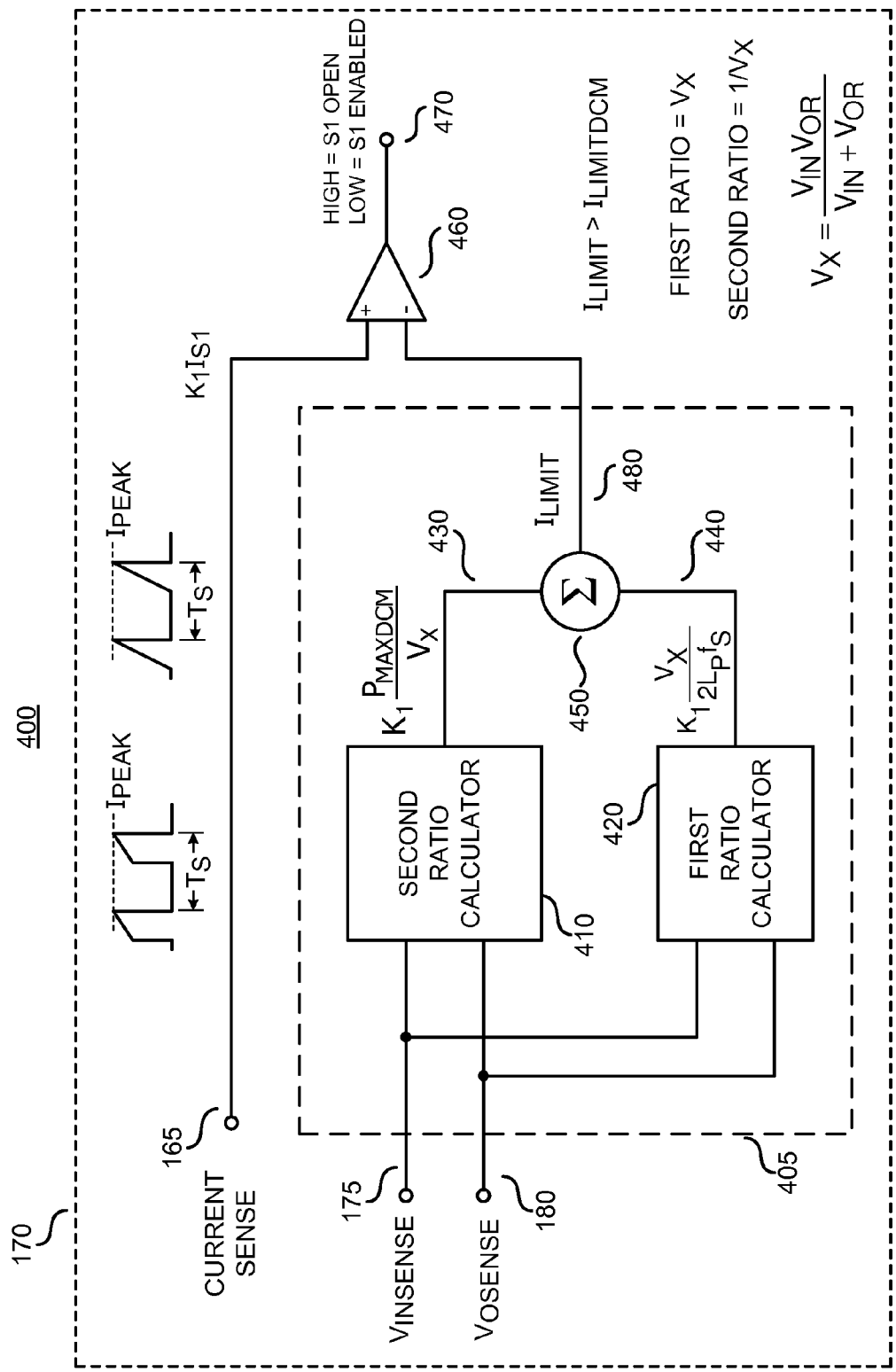
FIG. 4 is a diagram illustrating internal details of an example power supply controller that implements a technique using an example current limit circuit to generate a current limit signal to vary a current limit of a switch during continuous conduction mode to limit an output peak power of the power supply in accordance with the teachings of the present invention.

To illustrate, FIG. 4 is a diagram illustrating some internal details of a portion of an example power supply controller 170 of a power supply 400 in accordance with the teachings of the present invention. In the example, power supply controller 170 implements a technique using an example current limit circuit 405 to generate a current limit signal that varies a current limit of a switch during continuous conduction mode to limit an output peak power of the power supply in accordance with the teachings of the present invention. It is noted that other conventional details of power supply controller 170 known to persons skilled in the art are not illustrated in detail so as not to obscure the teachings of the present invention. It is appreciated that internal details of the portion of example power supply controller 170 of FIG. 4 may be incorporated into power supply controller 170 shown FIGS. 1 and/or 3 in accordance with the teachings of the present invention and that similarly numbered features between the drawings may be substituted for one another in the drawings.

In the example of shown in FIG. 4, power supply controller 170 includes a current limit circuit 405 to generate a current limit signal 480, which is labeled LIMIT in FIG. 4, in response to the input voltage $V_{IN}$ and the output voltage $V_O$ while the power supply is in continuous conduction mode. It is appreciated that the current limit $I_{LIMIT}$ corresponds to the peak current $I_{PEAK}$ of switch current $I_{S1}$ 160 that is to flow through switch S1 190 as shown in FIGS. 1 and/or 3 in accordance with the teachings of the present invention. The portion of power supply 170 illustrated in the example of FIG. 4 shows a current limit comparator 460 having an output 470 that is coupled to the drive signal generator of power supply controller 170 to open switch S1 190 (i.e., turn switch S1 190 off) when the output 470 is high and enable switch S1 190 (i.e., allow switch S1 190 to turn on) when the output 470 is low.

As shown in the depicted example, current limit comparator 460 includes a first input coupled to receive a current sense signal 165, which is representative of a switch current $I_{S1}$ 160 through the switch S1 190. A second input of the current limit comparator 460 is coupled to receive the current limit signal 480 output from current limit circuit 405 in accordance with the teachings of the present invention.

In the example shown in FIG. 4, Equation (6) above is realized in analog circuitry to generate the current limit signal 480 that is varied in accordance with the teachings of the present invention. Specifically, Equation (6) provides the relationship to realize the current limit, which corresponds to the peak current labeled $I_{PEAK}$ in Equation (6) as $$I_{PEAK} = \frac{P_{MAXDCM}}{V_X} + \frac{V_X}{2L_P f_S}.$$

As shown in FIG. 4, the term $$\frac{V_X}{2L_P f_S}$$

of Equation (6) corresponds to first ratio signal 440, which is generated by first ratio calculator 420 in current limit circuit 405. As shown, first ratio calculator 420 is coupled to receive $V_{INSENSE}$ 175 and $V_{OSENSE}$ 180. The term $$\frac{P_{MAXDCM}}{V_X}$$

of Equation (6) corresponds to second ratio signal 430, which is generated by second ratio calculator 410 in current limit circuit 405. As shown, second ratio calculator is also coupled to receive $V_{INSENSE}$ 175 and $V_{OSENSE}$ 180. The first ratio signal 440 and the second ratio signal 430 are summed with summing circuit 450 to provide the current limit $I_{LIMIT}$ 480 that is varied according to Equation (6), which is coupled to be received by the current limit comparator 460 while the power supply is in continuous conduction mode.

In the illustrated example, the first ratio calculator corresponds to the ratio $V_X$, which as summarized above in Equation (3) is $$V_X = \frac{V_{IN} V_{OR}}{V_{IN} + V_{OR}},$$

which is the ratio of the product of the input voltage and the reflected output voltage of the power supply, to the sum of the input voltage and the reflected output voltage of the power supply. Similarly, the second ratio calculator corresponds to the ratio of $1/V_X$, which is the reciprocal of $V_X$. Thus, the second ratio is $$1/V_X = \frac{1}{V_X} = \frac{V_{IN} + V_{OR}}{V_{IN} V_{OR}}, \qquad (10)$$

which is the ratio of the sum of the input voltage and the reflected output voltage of the power supply, to the product of the input voltage and the reflected output voltage of the power supply.

With respect Equation (3) above, it is observed that the ratio of the product of the input voltage $V_{IN}$ and the reflected output voltage $V_{OR}$, to the sum of the input voltage $V_{IN}$ and the reflected output voltage $V_{OR}$ is similar to the relationship used to determine the equivalent resistance $R_{EQ}$ of two parallel coupled resistors $R_1$ and $R_2$ $$R_{EQ} = \frac{R_1 R_2}{R_1 + R_2}. \quad (11)$$

Figure 5:
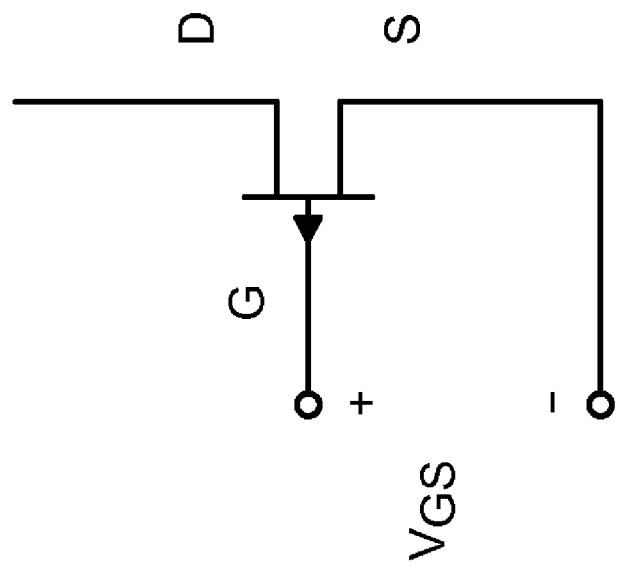
FIG. 5 shows example variable resistances that may used in an example current limit circuit in accordance with the teachings of the present invention.
Figure 5:

With the similarities of Equations (3) and (11) above in mind, the value of ratio $V_X$ can be modeled using analog circuitry to represent $V_X$ from $V_{IN}$ and $V_{OR}$ by using variable resistances. FIG. 5 shows example variable resistances 500 that may be used in an example current limit circuit to model $V_X$ and $1/V_X$ of Equations (3) and (10) in accordance with the teachings of the present invention. As shown in FIG. 5, a variable resistance $R_{DS}$ corresponds to a p-channel JFET having a variable resistance that is responsive to the gate to source voltage $V_{GS}$ of the JFET. In operation, the drain to source resistance of a JFET operating in the unsaturated region is directly proportional to the gate to source voltage $V_{GS}$. Thus, the value of the variable resistance is equal to $$R_{DS} = \frac{V_{GS}}{I_K} \quad (12)$$

where $R_{DS}$ is the resistance, $V_{GS}$ is the gate-source voltage and $I_K$ is a constant having the units of current that defines the relationship between $V_{GS}$ and $R_{DS}$.

In one example, a first voltage controlled variable resistance, such as a first JFET, responsive to a signal representative of input voltage $V_{IN}$ can be used to model the input voltage $V_{IN}$. A second voltage controlled variable resistance, such as a second JFET, coupled in parallel with the first variable resistance and responsive to a signal representative of a reflected output voltage $V_{OR}$ can be used to model the output voltage $V_O$ to model ratios representative of a first ratio $V_X$ and a second ratio of $1/V_X$, as defined in the Equations above in accordance with the teachings of the present invention.

Figure 6:
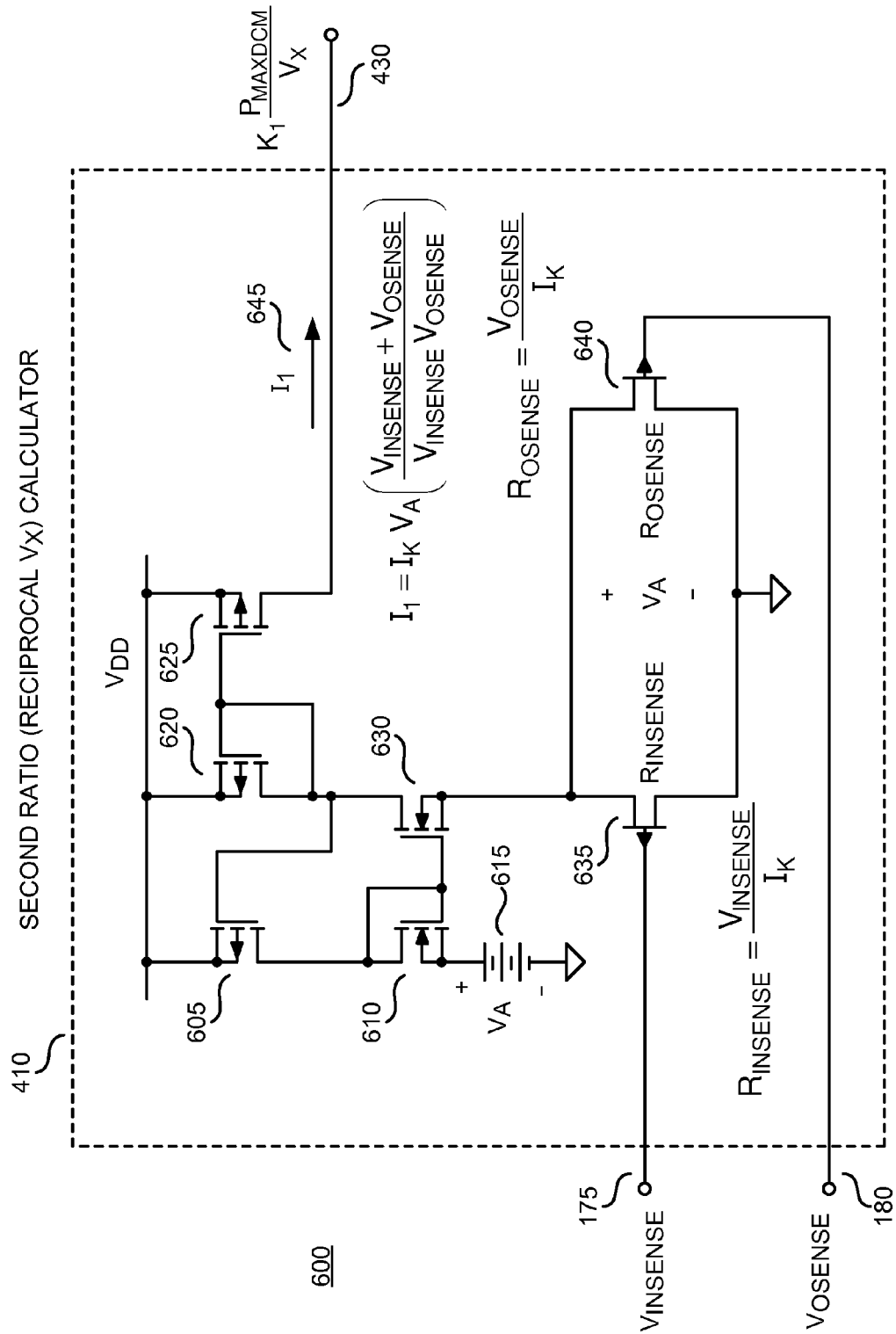
FIG. 6 shows an example schematic that may used to implement a second ratio calculator circuit used in an example current limit circuit in accordance with the teachings of the present invention.

To illustrate, FIG. 6 shows a schematic that may used to implement an example of a second ratio calculator circuit 410 used in an example current limit circuit 405 in accordance with the teachings of the present invention. It is appreciated that second ratio calculator circuit 410 of FIG. 6 is one example of a second ratio calculator circuit that may be incorporated into example current limit circuit 405 of FIG. 4 in accordance with the teachings of the present invention and that similarly numbered features between the drawings may be substituted for one another in the drawings.

In the illustrated example, second ratio calculator circuit 410 generates a second ratio signal 430, which is proportional to the term $$\frac{P_{MAXDCM}}{V_X}$$

from Equation (6) above multiplied by a constant $K_1$. Accordingly, the second ratio signal 430 is inversely proportional to $V_X$. Stated in another way, the second ratio signal 430 is proportional to the reciprocal of $V_X$ as shown in Equation (10) above, or $$1/V_X = \frac{V_{IN} + V_{OR}}{V_{IN} V_{OR}},$$

which is the ratio of the sum of the input voltage and the reflected output voltage of the power supply, to the product of the input voltage and the reflected output voltage of the power supply.

Referring specifically to the example shown in FIG. 6, second ratio calculator circuit 410 includes a variable resistance 635 coupled in parallel with a variable resistance 640. In the example, variable resistance 635 is a p-channel JFET that is coupled to have a gate to source voltage $V_{GS}$ responsive to input voltage sense signal $V_{INSENSE}$ 175, and variable resistance 640 is a p-channel JFET that is coupled to have a gate to source voltage $V_{GS}$ responsive to output voltage sense signal $V_{OSENSE}$ 180. When variable resistances 635 and 640 are operating in their unsaturated regions, the resistance $R_{INSENSE}$ of variable resistance 635 is proportional to the input voltage according to $$R_{INSENSE} = \frac{V_{INSENSE}}{I_K}, \quad (13)$$

and the resistance $R_{OSENSE}$ of variable resistance 640 is proportional to the output voltage according to $$R_{OSENSE} = \frac{V_{OSENSE}}{I_K}, \quad (14)$$

where $I_K$ is a constant having the units of current that defines the relationship between the gate voltages and the respective resistances for the particular p-channel JFETs that comprise variable resistances 635 and 640.

In the example, variable resistances 635 and 640 are coupled to one current path of a current mirror formed with transistors 610 and 630. As shown, a reference voltage source 615 is coupled to another current path of the current mirror formed with transistors 610 and 630, such that a reference voltage $V_A$ is imposed or established across parallel coupled variable resistances 635 and 640. As shown in FIG. 6, a transistor 605 is coupled to transistor 610 and a transistor 620 is coupled to transistor 630. A current mirror is formed with transistor 620 and a transistor 605. As shown, a current mirror is also formed with transistors 620 and 625, and has a current path through which a current through parallel coupled variable resistances 635 and 640 is driven by voltage $V_A$. The current mirror formed with transistors 620 and 625 includes another current path. Accordingly, the current mirror formed with transistors 620 and 625 mirrors the current driven through the parallel coupled variable resistances 635 and 640 to generate a current $I_1$ in the other current path, where $$I_1 = I_K V_A \left( \frac{V_{INSENSE} + V_{OSENSE}}{V_{INSENSE} V_{OSENSE}} \right), \quad (15)$$

which is second ratio signal 430. Accordingly, the output second ratio signal 430 is proportional to the first term in Equation (6) above, and can be rewritten as $$K_1 \frac{P_{MAXDCM}}{V_X}. \quad (16)$$

Figure 7:
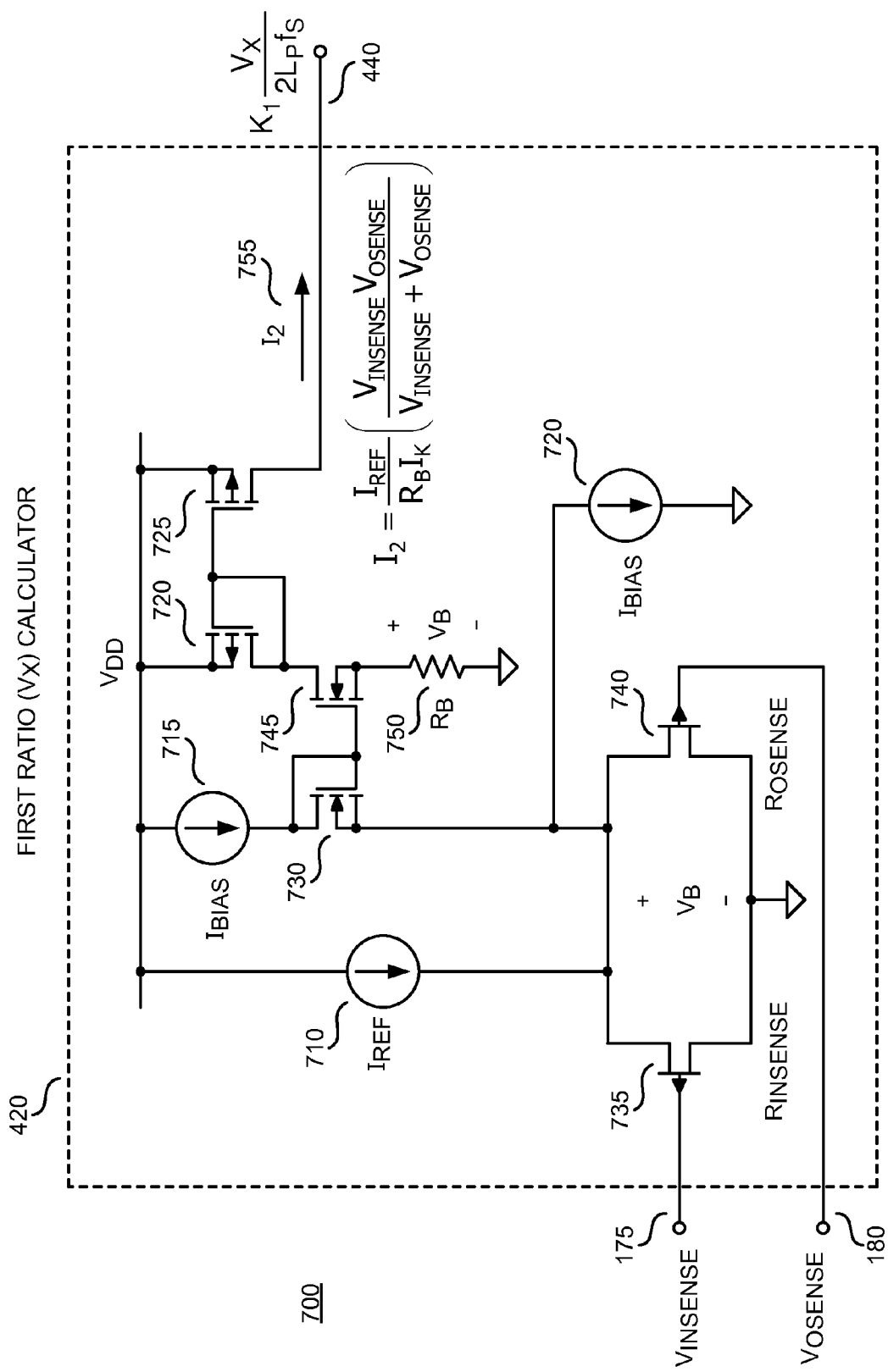
FIG. 7 shows an example schematic that may used to implement a first ratio calculator circuit used in an example current limit circuit in accordance with the teachings of the present invention.

FIG. 7 shows a schematic that may used to implement an example of a first ratio calculator circuit 420 used in an example current limit circuit 405 in accordance with the teachings of the present invention. It is appreciated that first ratio calculator circuit 420 of FIG. 7 is one example of a first ratio calculator circuit that may be incorporated into example current limit circuit 405 of FIG. 4 in accordance with the teachings of the present invention and that similarly numbered features between the drawings may be substituted for one another in the drawings.

In the illustrated example, first ratio calculator circuit 420 generates a first ratio signal 440, which is proportional to the term $$\frac{V_X}{2L_P f_S}$$

from Equation (6) above multiplied by the constant $K_1$. Accordingly, the first ratio signal 440 is proportional to $V_X$, as shown in Equation (3) above, or $$V_X = \frac{V_{IN} V_{OR}}{V_{IN} + V_{OR}},$$

which is the ratio of the product of the input voltage and the reflected output voltage of the power supply, to the sum of the input voltage and the reflected output voltage of the power supply.

Referring specifically to the example shown in FIG. 7, first ratio calculator circuit 420 includes a variable resistance 735 coupled in parallel with a variable resistance 740. In the example, variable resistance 735 is a p-channel JFET that is coupled to have a gate to source voltage $V_{GS}$ responsive to input voltage sense signal $V_{INSENSE}$ 175, and variable resistance 740 is a p-channel JFET that is coupled to have a gate to source voltage $V_{GS}$ responsive to output voltage sense signal $V_{OSENSE}$ 180. Since JFETs 735 and 740 are identical respectively to JFETs 635 and 640 in FIG. 6, the resistance $R_{INSENSE}$ of variable resistance 735 is the same as defined in Equation (13) above and the resistance $R_{OSENSE}$ of variable resistance 740 is the same as defined in Equation (14) above.

As shown in the example depicted in FIG. 7, a reference current source 710 is coupled to drive a reference current $I_{REF}$ through parallel coupled variable resistances 735 and 740. According to Ohm's Law, the voltage drop $V_B$ across the parallel coupled variable resistances 735 and 740 is therefore proportional to $$V_B = \frac{I_{REF}}{I_K} \left( \frac{V_{INSENSE} V_{OSENSE}}{V_{INSENSE} + V_{OSENSE}} \right) \quad (17)$$

As shown in the example, a current mirror is formed with transistors 730 and 745, which includes a current path coupled to the parallel coupled variable resistances 735 and 740. As shown, the current path also includes two bias current sources 715 and 720, which are coupled to provide a bias current $I_{BIAS}$ through the current path coupled to the parallel coupled variable resistances 735 and 740 without adding additional current to the $I_{REF}$ current driven through the parallel coupled variable resistances 735 and 740. As shown in the example, the current mirror formed with transistors 730 and 745 includes another current path that is coupled to a resistor $R_B$ 750, across which the voltage $V_B$ is imposed or established. According to Ohm's Law, the current through resistor $R_B$ 750 is therefore proportional to $$\frac{V_B}{R_B} = \frac{I_{REF}}{R_B I_K} \left( \frac{V_{INSENSE} V_{OSENSE}}{V_{INSENSE} + V_{OSENSE}} \right) \quad (18)$$

As shown in FIG. 7, another current mirror is formed with transistors 720 and 725, which includes a current path coupled to resistor $R_B$ 750, across which the voltage $V_B$ is imposed or established. As a result, the current mirror formed with transistors 720 and 725 mirrors the current through resistor $R_B$ 750 through another current path, which generates a current $I_2$ that is proportional to the current driven through resistor $R_B$ 750, where $$I_2 = \frac{I_{REF}}{R_B I_K} \left( \frac{V_{INSENSE} V_{OSENSE}}{V_{INSENSE} + V_{OSENSE}} \right), \quad (19)$$

which in the example is first ratio signal 440. Accordingly, the output first ratio signal 440 is proportional to the second term in Equation (6) above, and can be rewritten as $$K_1 \frac{V_X}{2L_P f_S}. \quad (20)$$

Referring briefly back to the example current limit calculator 405 illustrated in FIG. 4, it can now be observed that the first ratio signal 440 output from first ratio calculator 420 is generated according to Equation (20) above and that the second ratio signal 430 output from second ratio calculator 410 is generated according to Equation (16) above. In the example, first ratio signal 440 and second ratio signal 430 are coupled to be summed by summer 450 to produce current limit signal $I_{LIMIT}$ 480 to realize a current limit $I_{PEAK}$ that is varied according to Equation (6) above while the power supply is operating in continuous conduction mode.

In one example, when the operation of the power supply enters discontinuous conduction mode, the output peak power of the power supply becomes independent of the input voltage. Accordingly, the current limit is no longer varied when the power supply is in discontinuous conduction mode. Thus, the current limit is then set under this discontinuous conduction mode condition to a fixed or constant current limit value $I_{LIMDCM}$, which may also be referred to as $I_{PEAKCRIT}$ above, in accordance with the teachings of the present invention.

Figure 8:
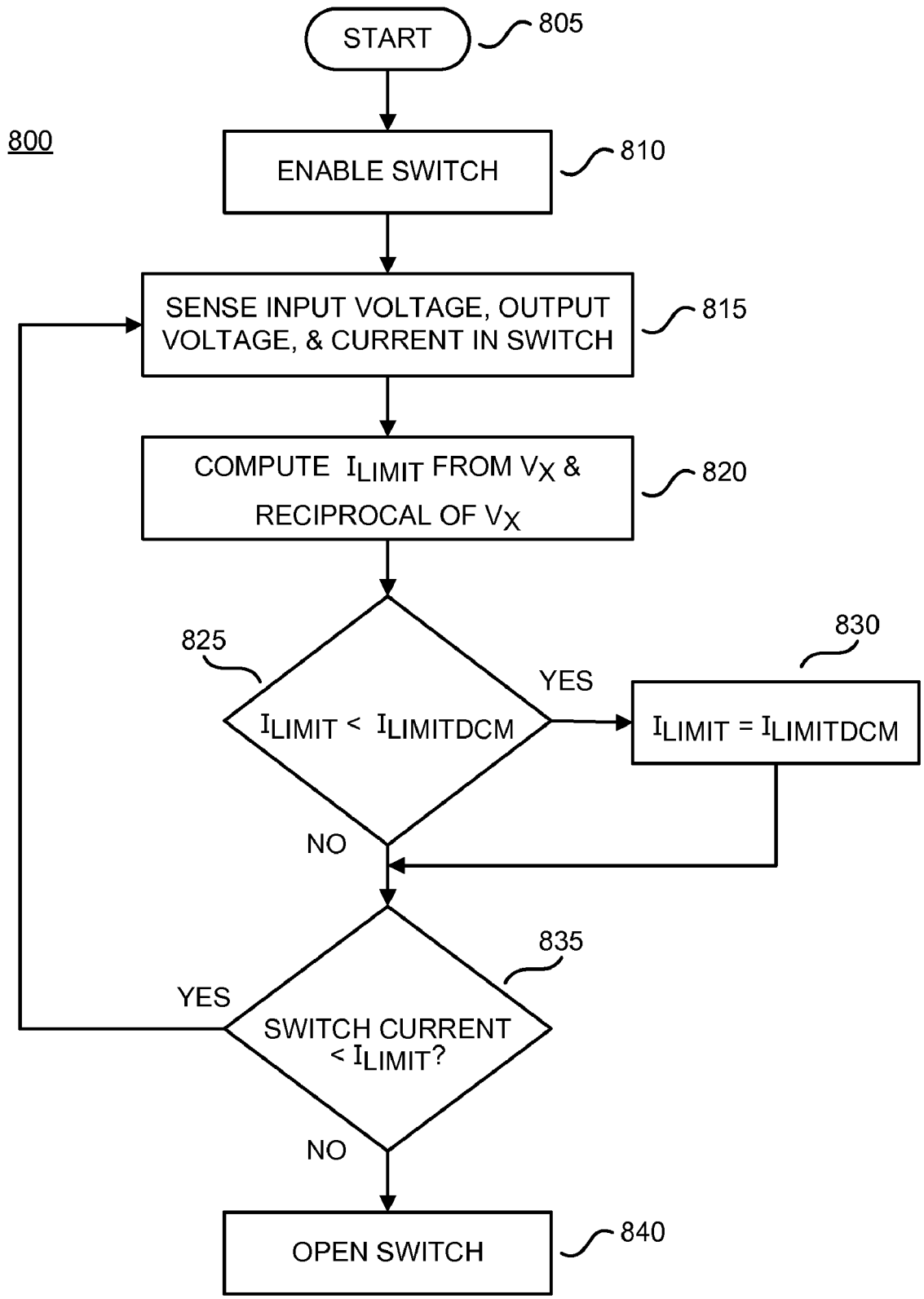
FIG. 8 shows an example flow chart diagram that may be used to implement a method to vary a current limit signal during continuous conduction mode to limit an output peak power of an example power supply in accordance with the teachings of the present invention.

FIG. 8 shows an example flow chart diagram 800 that may used to implement a method to generate a current limit signal to limit an output peak power of an example power supply in accordance with the teachings of the present invention. As shown in the depicted example, processing starts at block 805. At block 810, the switch is enabled (i.e., allowed to turn on). To illustrate, this switch may correspond to, for example, switch S1 190 of FIGS. 1 and/or 3. At block 815, the input voltage, output voltage, and current in the switch are sensed. These signals may correspond to, for example, input voltage sense 175, output voltage sense 180 and current sense 165 in FIGS. 1 and/or 3. At block 820, $I_{LIMIT}$ is computed from $V_X$ and $1/V_X$. At blocks 825 and 830, LIMIT is set to a constant current limit value of $I_{LIMITDCM}$ if the computed value of $I_{LIMIT}$ is less than $I_{LIMITDCM}$, which would indicate that the power supply is operating in discontinuous conduction mode. At block 835, it is determined whether the switch current is less than the LIMIT value. If so, processing loops back to block 815 where the input voltage, output voltage, and current in the switch are sensed again. If not, the switch has reached the current limit $I_{LIMIT}$, and it is opened (i.e., turned off) in block 840.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A power supply controller, comprising:
   an input voltage sense input coupled to sense an input voltage sense signal representative of an input voltage of a power supply;
   an output voltage sense input coupled to sense an output voltage sense signal representative of an output voltage of the power supply;
   a current limit circuit coupled to generate a current limit signal, wherein the current limit signal is varied relative to a first ratio representative of a ratio of a product of the input voltage and a scaled output voltage of the power supply, to a sum of the input voltage and the scaled output voltage of the power supply, wherein the current limit signal is further varied relative to a second ratio representative of a ratio of the sum of the input voltage and the scaled output voltage of the power supply, to the product of the input voltage and the scaled output voltage of the power supply, wherein the second ratio is substantially equal to a reciprocal of the first ratio, wherein the current limit circuit includes a first variable resistance coupled in parallel with a second variable resistance, wherein the first variable resistance is coupled to be responsive to the input voltage and wherein the second variable resistance is coupled to be responsive to the output voltage; and
   a drive signal generator coupled to generate a drive signal in response to the current limit signal to drive a power switch of the power supply to limit an output power of the power supply in response to the input voltage.

2. The power supply controller of claim 1 wherein the current limit signal is further varied relative to a sum of the first ratio and the second ratio.

3. The power supply controller of claim 1 wherein the current limit circuit is coupled to drive a reference current through the first variable resistance coupled in parallel with the second variable resistance to generate a voltage across the first and second variable resistances.

4. The power supply controller of claim 3 wherein the current limit circuit is coupled to generate a first current representative of the voltage across the first and second variable resistances, wherein the first current is further representative of the first ratio.

5. The power supply controller of claim 1 wherein the current limit circuit includes a third variable resistance coupled in parallel with a fourth variable resistance, wherein the third variable resistance is coupled to be responsive to the input voltage and wherein the fourth variable resistance is coupled to be responsive to the output voltage.

6. The power supply controller of claim 5 wherein the current limit circuit is coupled to establish a reference voltage across the third variable resistance coupled in parallel with the fourth variable resistance to generate a second current representative of the second ratio.

7. The power supply controller of claim 1 wherein the current limit circuit is coupled to vary the current limit signal during a continuous conduction mode operation of the power supply.

8. The power supply controller of claim 7 wherein the drive signal generator is coupled to generate the drive signal to drive the power switch of the power supply to limit an output peak power of the power supply to an approximately constant value over a range of input voltages.

9. A current limit generator circuit for use in a power supply controller, comprising:
   a first ratio calculator coupled to receive an input voltage sense signal representative of an input voltage of a power supply and an output voltage sense signal representative of an output voltage of the power supply, the first ratio calculator to generate a first ratio signal representative of a ratio of a product of the input voltage and a scaled output voltage of the power supply, to a sum of the input voltage and the scaled output voltage of the power supply, wherein the first ratio calculator includes a first variable resistance coupled in parallel with a second variable resistance, wherein the first variable resistance is coupled to be responsive to the input voltage and wherein the second variable resistance is coupled to be responsive to the output voltage;
   a second ratio calculator coupled to receive the input voltage sense signal and the output voltage sense signal, the second ratio calculator to generate a second ratio signal representative of a ratio of the sum of the input voltage and the scaled output voltage of the power supply, to the product of the input voltage and the scaled output voltage of the power supply; and
   a summing circuit coupled to generate a current limit signal in response to a sum of the first and second ratio signals.

10. The current limit signal generator of claim 9 wherein the first ratio calculator further includes a reference current source coupled to drive a reference current through the first and second variable resistances to generate a voltage across the first and second variable resistances.

11. The current limit signal generator of claim 10 further wherein the first ratio calculator further includes a first current minor having a first current path through which the reference current is driven, the first current mirror having a second current path coupled to a resistor across which the voltage across the first and second variable resistances is established.

12. The current limit signal generator of claim 11 wherein the first ratio calculator further includes a second current minor coupled to the resistor and coupled to generate a first current in response to the voltage across the first and second variable resistances, wherein the first current is representative of the first ratio.

13. The current limit signal generator of claim 9 wherein the first and second variable resistances comprise first and second JFETs.

14. The current limit signal generator of claim 9 wherein the second ratio calculator includes a third variable resistance coupled in parallel with a fourth variable resistance, wherein the third variable resistance is coupled to be responsive to the input voltage and wherein the fourth variable resistance is coupled to be responsive to the output voltage.

15. The current limit signal generator of claim 14 wherein the second ratio calculator is coupled to establish a reference voltage across the third variable resistance coupled in parallel with the fourth variable resistance to generate a current through the third and fourth variable resistances.

16. The current limit signal generator of claim 15 wherein the second ratio calculator further includes a current minor having a first current path through which the current through the third and fourth variable resistances is driven in response to the reference voltage across the third and fourth variable resistances, the current mirror having a second current path to generate a second current representative of the second ratio.

17. The current limit signal generator of claim 14 wherein the third and fourth variable resistances comprise third and fourth JFETs.

18. A method of generating a current limit for use in a power supply controller, comprising:
 calculating a first ratio of a product of an input voltage and a scaled output voltage of a power supply, to a sum of the input voltage and the scaled output voltage of the power supply, wherein calculating the first ratio comprises:
  setting a first variable resistance in response to the input voltage;
  setting a second variable resistance in response to an output voltage; and
  generating a first signal proportional to an equivalent resistance of the first variable resistance coupled in parallel with the second variable resistance;
 calculating a second ratio which is substantially equal to a reciprocal of the first ratio; and
 summing the first and second ratios to generate a current limit for a switch coupled to an energy transfer element of the power supply during a continuous conduction mode of the power supply.

19. The method of generating the current limit of claim 18 further comprising setting the current limit substantially equal a constant value during a discontinuous conduction mode of the power supply.

20. The method of generating the current limit of claim 18 wherein calculating the second ratio comprises generating a
 setting a third variable resistance in response to the input voltage;
 setting a fourth variable resistance in response to an output voltage; and
 generating a second signal proportional to a reciprocal of an equivalent resistance of the third variable resistance coupled in parallel with the fourth variable resistance.

21. The method of generating the current limit of claim 18 further comprising switching the switch coupled to an energy transfer element of the power supply in response to the current limit to limit an output peak power of the power supply in response to the input voltage of the power supply.

22. The method of generating the current limit of claim 18 further comprising sensing a reflected voltage received from an energy transfer element during an off time of the switch to sense the output voltage.

23. The method of generating the current limit of claim 18 further comprising sensing a reflected voltage received from the energy transfer element during an on time of the switch to sense the input voltage.

* * * * *

UNITED STATES PATENT AND TRADEMARK OFFICE
CERTIFICATE OF CORRECTION

| | | |
|---|---|---|
| PATENT NO. | : 8,310,850 B2 | Page 1 of 1 |
| APPLICATION NO. | : 12/645295 | |
| DATED | : November 13, 2012 | |
| INVENTOR(S) | : William M. Polivka | |

It is certified that error appears in the above-identified patent and that said Letters Patent is hereby corrected as shown below:

In the Claims

Column 14, lines 60 and 67 (claims 11 and 12), "minor" should read --mirror--.

Column 15, line 19 (claim 16), "minor" should read --mirror--.

Signed and Sealed this
Seventeenth Day of February, 2015

Michelle K. Lee
*Deputy Director of the United States Patent and Trademark Office*